United States Patent [19]

Carman et al.

[11] Patent Number: 5,203,882
[45] Date of Patent: Apr. 20, 1993

[54] BONDING ADJUVANTS FOR VITREOUS BOND FORMULATIONS AND PROCESS FOR BONDING WITH

[75] Inventors: Lee A. Carman, Worcester; Xiaoming Li, Shrewsbury, both of Mass.

[73] Assignee: Norton Company, Worcester, Mass.

[21] Appl. No.: 826,543

[22] Filed: Jan. 27, 1992

[51] Int. Cl.⁵ ............................................. B24D 3/00
[52] U.S. Cl. ...................................... 51/293; 51/302; 51/304; 51/308; 51/309
[58] Field of Search ................. 51/293, 302, 304, 308, 51/309

[56] References Cited

U.S. PATENT DOCUMENTS

| | | | |
|---|---|---|---|
| 4,169,337 | 10/1979 | Payne | 51/308 |
| 4,460,489 | 7/1984 | Kendall | 51/308 |
| 4,588,421 | 5/1986 | Payne | 51/308 |
| 4,997,461 | 3/1991 | Markhoff-Matheny | 51/309 |
| 5,094,672 | 3/1992 | Giles, Jr. et al. | 51/309 |
| 5,110,322 | 5/1992 | Narayanan et al. | 51/308 |

*Primary Examiner*—Mark L. Bell
*Assistant Examiner*—Willie J. Thompson
*Attorney, Agent, or Firm*—David Bennett

[57] ABSTRACT

The use of small amount of silica sol in conjunction with an organic binding agent significantly increases the strength of the bond in a vitreous bonded alumina containing abrasive wheel.

14 Claims, No Drawings

BONDING ADJUVANTS FOR VITREOUS BOND FORMULATIONS AND PROCESS FOR BONDING WITH

BACKGROUND OF THE INVENTION

The present invention relates to bonded abrasive products and specifically to products bonded with a vitreous bond formulation that has a surprisingly high green strength.

In producing a vitreous bonded abrasive product, such as a grinding wheel, the abrasive grits are first mixed with the bond material and the mixture is formed into the desired shape in a mold. The "green", or unfired wheel is then removed from the mold and placed in a furnace to form the bond. Because the bond material is conventionally a mixture of components that together form a glass of the desired structure when fused together, the actual firing process comprises several overlapping, sequential stages. The first stage is the melting of the components. This does not necessarily occur at the same temperature for all components. These components then must fuse together to form a homogeneous mass. This sometimes is not complete even when the bond is formed and this gives rise to uneven bond strength through the finished product. The fused bond mass must then flow till it is located essentially completely on the surfaces of the grits and in the form of bond posts joining the grits together to give the finished bonded product. The whole process typically takes several days to be completed.

Until the bond has formed there is little holding the structure together. Thus it is often difficult to remove the green wheel from the mold and to stop it from slumping during firing unless special measures are taken to prevent this. The problem is particularly acute when, as is usually the case, the green wheels are stacked in the kiln for firing. With conventional bonds one of the components is often a clay that will provide some green strength but it is usually necessary to supplement the bond with a green strength binder which is usually an organic compound such as starch or dextrin usually mixed with a glue formulation. The purpose of this is to provide temporary holding power so that the unfired product can be safely handled before it is fired. This organic binder will of course burn off as the product is fired in the kiln and this will limit the effectiveness of such additions.

The problem of lack of unfired strength is particularly acute when the vitreous bond material is a frit, that is, a pre-formed glass ground to a powder. Such bonds are described in U.S. Pat. No. 4,898,597. They have the advantage that the glass formation stage has already occurred so that the bond will have a high degree of uniformity throughout the bonded product. However any clay component of such a frit has lost its identity in the glass structure and no longer has binding power. Thus the amount of organic binder that is needed is greatly increased and at the same time, the glue component can not be used. Even with the maximum organic binder possible, the rapid loss of such material during the early stages of firing often leads to an unacceptable level of slumping in the kiln unless great care is used in the loading of the green wheels.

Thus there is a great need for a means of providing improved green strength in unfired vitreous bonded products especially where the bond is a frit bond material.

DESCRIPTION OF THE INVENTION

A vitreous bond formulation has now been discovered that provides a significantly improved green strength. Abrasive products made using such formulations can be readily handled in the green state and fired without unacceptable losses due to slumping, even when the bond employs frit components. The formulation comprises a novel bonding adjuvant that confers these benefits on vitreous bonds, even when these are based on frit components. It is further found that the abrasive products made using these bonding adjuvants, in addition to having fewer losses due to failure of strength before or during firing, actually have improved strength after firing compared to products made without the assistance of the novel bonding adjuvant.

The vitreous bond bonding adjuvant of the invention comprises a silica sol and an organic binding agent in an aqueous dispersion medium.

The bonding adjuvant preferably comprises the silica sol and the organic binding in proportions to provide about 10 to about 30 weight % of silica and from about 30 to about 50 weight % of the organic binding agent. The most preferred formulations contain from about 35 to about 45 weight % of a 30% solids silica sol (or correspondingly lower proportions if the sol has a higher solids content) and from about 65 to about 55% by weight of the organic binding agent.

The invention also comprises a method of forming a vitreous bonded abrasive product which comprises coating the abrasive grits with a binding agent comprising a silica sol before formation of the bond. Where the bond material is a frit, it is often desirable to coat the frit particles in addition to the abrasive grits.

The silica sol can be any one of those commercially available from E. I. DuPont de Nemours Co. under the trademark "Ludox" though equivalent or similar products may also be used. It is also understood that products such as water glass, which is chemically a colloidal sodium silicate but which upon pH adjustment gives a silica sol, is also considered for the purposes of this description, as a silica sol. Such sols typically contain from 20 to about 60% solids, with about 30% to 50% being the most common, and because of the ease of handling, preferred, in the formulations of the invention.

Adhesion of the silica sol to the glass frit particles is believed to be assisted by partial dissolution of oxides on the surface of the glass particles into the basic, (pH 9-11), silica sol. This dissolution may create an interface layer between the sol and the glass particles and help the silica sol to adhere more efficiently to the frit particle surface.

Organic binding agents are used to improve the adhesion of the silica to the abrasive particle surface. These appear to function by providing a plurality of hydroxyl groups capable of hydrogen bonding with oxygen atoms of both the abrasive and the silica so as to form a bridge between the two. The use of such materials to impart green strength in vitreous bonded formulations is well known and typical materials which can also be used as the organic binding agent in the bonding adjuvants of this invention include dextrin, starch, agarose, pectin, lecithin and other related hydroxylated carbohydrates, animal glue, hydroxylated carboxylic acids such as malic acid, and latexes of hydroxyl-containing polymers as well as mixtures of such organic binding agents.

The preferred processes of the invention are those in which abrasive grits are treated with a mixture of an organic binding agent and a silica sol. These treated grits are then mixed with a vitreous bond material along with further quantities of the silica sol and optionally the organic binding agent, and the mixture is formed into the desired molded shape.

The preferred method of the invention therefore involves adding the bonding adjuvant in two portions: the first to the abrasive grits before they are contacted with the silica sol, and the second to the above mixture plus the vitreous bond components. In this way the bonding of the silica sol to both the grits and to the bond materials is enhanced.

The amount of the silica added in the form of the sol to the formulation of the vitreous bonded product can be up to about 3% of the weight of the particulate mass, (abrasive and vitreous bond components), in the formulation, and preferably from about 0.25 to about 2% of the particulate mass weight. This weight proportion is expressed as the equivalent silica weight rather than the weight of the (usually 30% solids) aqueous silica sol that is in fact used.

The use of silica in the present application is to be distinguished from those applications in which a silica coating is used to protect aluminous abrasive grains from attack by a vitreous bond. The function of the sol in the present invention is quite different, as has been fully described above to render the aluminous grains and resistant to hydrolytic attack during wet grinding.

The average size of the colloidal particles in the silica sol should preferably be from about 3 to about 40 millimicrons, and more preferably from about 5 to 15 millimicrons. Commercially available silica sols that meet these criteria include for example those sold by the DuPont Company under the registered trademark "Ludox" and specifically the grades referred to as HS30 and SM30. While larger particle sizes can be used, it is found that they give less effective cover because of the smaller numbers of particles in a sol of a given solids content. For the same reason it is preferred that the particles display as little agglomeration as possible.

As indicated above, the fired strength of the finished wheel is also improved by the use of the bonding adjuvants of the invention. This effect can be further enhanced by incorporating into the sol up to about 30% and preferably from about 10% up to about 25% by weight of the solids content of the sol, of boric acid. The effect of this is to lower the fusion temperature of the silica by formation of a borosilicate. This can be further enhanced by the presence of sodium in minor amount, such as by adding up to about 16%, such as from about 4 to about 10% of the sol weight, of sodium carbonate or sodium silicate. Obviously the use of sodium silicate will also provide part or all of the silica content of the sol.

DESCRIPTION OF THE PREFERRED EMBODIMENTS

The invention is now further described with reference to the following examples which are for the purpose of illustration and are not intended to imply any necessary limitation on the essential scope of the invention.

The performance of the products according to the invention was assessed against that of standard commercial formulations. Two tests were carried out. Discs ($3'' \times \frac{1}{2}$) were formed in a mold and then the strength of the green disc was determined by measuring the force needed to break the disc. The disc under test was clamped between steel jaws with half the disc projecting beyond the jaws. An increasing load was placed on the projecting portion until the disc broke. The load at this point was called the "Break Force". In the other test a $4'' \times 1'' \times \frac{1}{2}''$ bar was molded and fired and then subjected to a four point bending test to measure the flexural strength, (MOR). In each measurement at least three discs or bars were made and tested to determine the average and the standard deviation values.

The "makeability" and mixing characteristics were estimated visually and described qualitatively.

In the Examples that follow a number of abbreviations are used to indicate components of the mixtures. These are as follows:

Standard Binder: This indicates a binder formulation used commercially with raw vitreous bonds and the relevant abrasive grits.

Dextrin Binder: This is a binder developed in the laboratory specifically for use with frit-based vitreous bonds.

Exp. HS-30: This is a bonding adjuvant formulation employing the DuPont silica sol sold under the trade name, Ludox HS-30, (which contains 30% by weight of silica), and Dextrin Exp. SM-30: This is the same as the previous formulation with the substitution of Ludox SM-30, (which also contains 30 wt. % of silica), in place of HS-30.

Exp. WG: This experimental formulation substitutes water glass for the silica sols used in the previous exp. formulations D1: Dextrin: first addition of this component.

D2: Dextrin: second addition of this component.

AR-30: This is an organic binding additive developed for use with raw bonds. It is a component of the Standard Binder referred to above.

Exp. AR-30: is AR-30 with the addition of a silica sol.

EXAMPLE 1

This Example shows the improved green strength of vitreous bonded abrasive wheels using the adhesion promoting formulations of the invention.

In preparing the test samples described below for comparative evaluation the same techniques were used except where indicated. The formulations tested are shown, along with the results of such testing, in Table 1 below.

In the preparation of the formulations using a bonding adjuvant according to the invention, the dextrin addition was carried out in two stages: the first (D1) to the grits and accompanied by the silica sol, and the second (D2) after addition of the bond material to the mixture.

TABLE 1

| FORMULATION Features | 1<br>Standard Binder | 2<br>Dextrin Binder | 3<br>Bonding Adj.<br>(Silica Sol)<br>+<br>Dextrin<br>Exp. HS 30 | 4<br>water glass<br>+<br>Dextrin<br>Exp. WG |
|---|---|---|---|---|
| Abrasives (gram) | 1000 | 1000 | 1000 | 1000 |
| D1 (gram) | 10 | 12 | 12 | 12 |
| AR-30 (gram) | 16.6 | — | — | — |
| Water (gram) | — | 14.5 | — | — |
| Sol (gram) | — | — | 19.0 | 19.0 |

TABLE 1-continued

| FORMU-LATION Features | 1 Standard Binder | 2 Dextrin Binder | 3 Bonding Adj. (Silica Sol) + Dextrin Exp. HS 30 | 4 water glass + Dextrin Exp. WG |
|---|---|---|---|---|
| Bond (gram) | 106.2 (raw) | 93.0 (frit) | 93.0 (frit) | 93.0 (frit) |
| D2 (gram) | — | 20.0 | 20.0 | 20.0 |
| Mixing | Good | Wet | Wet | Good |
| Molding | Good | Fair | Good | Edge Wearing |
| Avg. Break Force (gram) | 521 | 412 | 1024 | 641 |

The abrasive grits were 80 grit fused alumina and the bond used was a commercial vitreous bond used with such grits. In the case of the Standard Binder the bond was formed from the raw components in situ. In the other tests, the bond was first formed in bulk and then crushed to form a frit which then became the bond component added. All samples were formed to the same porosity and structure.

As can be seen from the above data, the Experimental bonding adjuvant, incorporating a silica sol and dextrin perform extremely well with outstanding strength and good if slightly wet, makeability. Comparison with the Detrin Binder, from which it differs only in the substitution of HS 30 for a similar volume of water, shows the great difference that the presence of the silica makes. The Exp WG bonding adjuvant used on the frit bond performed at least as well as the Standard Binder on the raw bond.

From this data it is clear that the use of the bonding adjuvants of the invention makes frit bonds as easy to use as the regular raw bonds have been with the established vitreous bond formulations.

EXAMPLE 2

In this Example a further series of evaluations were performed using the same grits and proportions, and using the same mixing procedures. The data set out in Table 2 show that much the same results were obtained.

TABLE 2

| MIXING Feature | 5 Standard Binder | 6 Dextrin Binder | 7 Exp. HS 30 | 8 Exp. W.G. | 9 Exp. HS 30 | 10 Exp. HS 30 | 11 Exp. HS 30 | 12 Exp. HS 30 |
|---|---|---|---|---|---|---|---|---|
| Abra. (gram) | 1000 | 1000 | 1000 | 1000 | 1000 | 1000 | 1000 | 1000 |
| D1 (gram) | 8.0 | 13 | 13 | 13 | 13 | 13 | 13 | 13 |
| AR-30 (gram) | 19.2 | — | — | — | — | — | — | — |
| Water (gram) | — | 20.7 | — | — | — | — | — | — |
| Sol (Gram) | — | — | 27 | 27 | 25 | 22 | 20 | 25 |
| Bond (gram) | 134.5 (raw) | 117.7 (frit) | 117.7 (frit) | 117.7 (frit) | 117.7 (frit) | 117.7 (frit) | 117.7 (frit) | 110.0 (frit) |
| D2 (gram) | — | 20.0 | 20.0 | 20.0 | 20.0 | 20.0 | 20.0 | 20.0 |
| Mixing | Good | Wet | Wet | Good | Wet | Wet | Good | Wet |
| Molding | Good | Poor Weak | Good | Edge Wearing | Good | Good | Good | Good |
| Avg. Break Force (grams) | 328 | 88 | 469 | 297 | 474 | 533 | 455 | 357 |

EXAMPLE 3

In this Example essentially the same wheels in terms of proportions and structure, were made except that the fired alumina grits were replaced by a microcrystalline sol-gel alumina made by a process as described and claimed in U.S. Pat. No. 4,623,364. Part A of Table 3 presents the components of the various formulations. Part B shows that the bonding adjuvants of the present invention perform with frit bonds with the same high level of efficiency, as the previously used standards with raw bonds. The data presented in Part C is obtained by firing the bar samples of the abrasive product at 900° C. for an hour and then crushing the bar and dissolving in hydrogen fluoride solution. The samples have a theoretical weight % composition of 89.5% of the abrasive grits, and 10.5% of the bond. However there will also be a component attributable to the reaction of the bond with the grits (called herein "gel"). This is a particularly significant feature of microcrystalline aluminas bonded with a conventional vitreous bond because the high surface energy of the alumina increases the extent of this reaction and is suspected of leading to a deterioration of the grits and consequently of the performance of the abrasive product.

As will be seen the use of the bonding adjuvant significantly reduces the gel formation over that obtained with either the raw or the frit bonds.

TABLE 3

| FORMULATION | 13 Standard Binder | 13A Exp. HS 30 | 13B Exp. SM 30 | 14 Dextrin Binder | 15 Exp. HS 30 | 16 Exp. SM 30 |
|---|---|---|---|---|---|---|
| PART A |  |  |  |  |  |  |
| Abrasive (gram) | 1000 | 1000 | 1000 | 1000 | 1000 | 1000 |
| D1 (gram) | 8 | 8 | 8 | 13 | 13 | 13 |
| AR-30 (gram) | 19.2 | — | — | — | — | — |
| Water (gram) | — | — | — | 20.7 | — | — |
| Sol (Gram) | — | 19.2 | 19.2 | — | 20.7 | 20.7 |
| Bond (gram) | 134.5 (raw) | 134.5 (raw) | 134.5 (raw) | 117.7 (frit) | 117.7 (frit) | 117.7 (frit) |
| D2 (gram) | — | — | — | 20.0 | 20.0 | 20.0 |

TABLE 3-continued

| FORMULATION | 13 Standard Binder | 13A Exp. HS 30 | 13B Exp. SM 30 | 14 Dextrin Binder | 15 Exp. HS 30 | 16 Exp. SM 30 |
|---|---|---|---|---|---|---|
| PART B | | | | | | |
| Mixing | Good | — | — | Good | Little Dry | Little Dry |
| Molding | Good | — | — | Good | Good | Good |
| Av. Break Force (gm) Directly After Mix | 208 | — | — | 165 | 390 | 284 |
| Av. Break Force (gm) 110 Hours After Mix | 304 | — | — | 263 | 507 | 356 |
| PART C | | | | | | |
| Abrasive (wt %) | 88.54 | 87.19 | 87.28 | 87.61 | 88.00 | 88.64 |
| Bond (wt %) | 7.61 | 11.16 | 11.33 | 10.34 | 11.47 | 9.85 |
| Gel (wt %) | 3.85 | 1.65 | 1.39 | 2.05 | 0.53 | 1.51 |

EXAMPLE 4

This Example illustrates the beneficial effect of adding boron oxide to the silica sol in the bonding adjuvant. The amount added was one quarter of the amount of silica in the sol. The bonding adjuvant was used in the compositions identified as formulation #15 in Example 3. The flexural strengths of the green product and the same product after firing in a kiln for an hour at 400° C. were greatly increased.

TABLE 4

| | Flexural Strength (psi) | |
|---|---|---|
| Sample | Green | 400° C. |
| Form. #15 | 5–8 | 4–5 |
| #15 + $B_2O_3$ | 10–20 | 20–25 |

In a second series of tests to investigate the effect of adding boron oxide (in the form of boric acid for easy dissolution) a variety of formulations based on the bonded abrasive products used in Example 3 were made into wheels and tested for grinding performance. The results are set forth in Table 5 below. The wheels made had a 7 inch diameter and a half inch thickness. The wheels were tested on a Browne & Sharpe surface grinder at a wheel speed of 6500 sfpm and a table traverse speed of 50 fpm. A total of 20 passes at downfeed rates of 0.5 mil, 1.0 mil and 1.5 mil were used. The material ground was a 16 inch × 1¾ inch D3 die steel piece with a hardness of Rc 55-60. White & Bagley coolant E-55 was used.

In the Table 5, below, the following abbreviations are used:

BA—Boric Acid.
FW—Wheel density in g/cc after firing.
MOE—Elasticity Modulus.
SBP—Sand Blast Penetration, a measure of wheel hardness.
Power—Power consumption to remove the metal in the test.
Finish—Measure of the smoothness of ground surface. Lower number indicates smoother finish.
MRR—Metal Removal Rate, in cubic inches per minute.
G Ratio—Average value of: Metal removed/wheel wear over given period.

Table 5A gives the information on formulations used in Table 5.

TABLE 5

| Bond | Form. | FW g/cc | MOE d/cm² | SBP 2/15 | Down Feed | Power k-w | Finish Ra | MRR in³/min | G-Ratio Ave. |
|---|---|---|---|---|---|---|---|---|---|
| Raw | 17 | 2.085 | 42.84 | 2.03 | 0.5 | 900 | 16 | 0.0101 | 5.12 |
| Frit | 18 | 2.067 | 41.46 | 1.99 | 0.5 | 940 | 17 | 0.0109 | 5.65 |
| Frit | 19 | 2.079 | 43.37 | 1.94 | 0.5 | 1000 | 17 | 0.0101 | 5.53 |
| Frit | 20 | 2.079 | 44.36 | 1.78 | 0.5 | 980 | 15 | 0.0113 | 6.00 |
| Frit | 21 | 2.107 | 46.55 | 1.48 | 0.5 | 820 | 15 | 0.0101 | 5.41 |
| Frit | 22 | 2.099 | 44.75 | 1.64 | 0.5 | 770 | 18 | 0.0101 | 4.98 |
| Raw | 17 | 2.085 | 42.84 | 2.03 | 1.0 | 940 | 26 | 0.0206 | 5.66 |
| Frit | 18 | 2.067 | 41.46 | 1.99 | 1.0 | 960 | 23 | 0.0206 | 5.50 |
| Frit | 19 | 2.079 | 43.37 | 1.94 | 1.0 | 1100 | 26 | 0.0210 | 6.18 |
| Frit | 20 | 2.079 | 44.36 | 1.78 | 1.0 | 1100 | 26 | 0.0206 | 5.90 |
| Frit | 21 | 2.107 | 46.55 | 1.48 | 1.0 | 900 | 27 | 0.0206 | 5.67 |
| Frit | 22 | 2.099 | 44.75 | 1.64 | 1.0 | 980 | 27 | 0.0215 | 5.79 |
| Raw | 17 | 2.085 | 42.84 | 2.03 | 1.5 | 1000 | 26 | 0.0296 | 5.33 |
| Frit | 18 | 2.067 | 41.46 | 1.99 | 1.5 | 980 | 29 | 0.0311 | 5.52 |
| Frit | 19 | 2.079 | 43.37 | 1.94 | 1.5 | 1100 | 26 | 0.0315 | 6.35 |
| Frit | 20 | 2.079 | 44.36 | 1.78 | 1.5 | 1140 | 35 | 0.0323 | 6.43 |
| Frit | 21 | 2.107 | 46.55 | 1.48 | 1.5 | 920 | 35 | 0.0322 | 6.24 |
| Frit | 22 | 2.099 | 44.75 | 1.64 | 1.5 | 1060 | 30 | 0.0320 | 6.14 |

TABLE 5A

| FORMULATION | 17 | 18 | 19 | 20 | 21 | 22 |
|---|---|---|---|---|---|---|
| Abrasive | 100 | 100 | 100 | 100 | 100 | 100 |

TABLE 5A-continued

| FORMULATION | 17 | 18 | 19 | 20 | 21 | 22 |
|---|---|---|---|---|---|---|
| Bond | 13.45 (raw) | 11.77 frit | 11.77 frit | 11.77 frit | 11.77 frit | 11.77 frit |
| AR-30 | 1.92 | — | — | — | — | — |
| Water | — | 2.07 | — | — | — | — |
| D1 | 0.8 | 1.3 | 1.3 | 1.3 | 1.3 | 1.3 |
| D2 | — | 2.0 | 2.0 | 2.0 | 2.0 | 2.0 |
| HS-30 | — | — | 2.2 | — | — | 2.28 |
| SM-30 | — | — | — | 2.2 | 2.28 | — |
| BA | — | — | .3 | 0.3 | — | — |

From the above data it is clear that the addition of boron oxide has no deleterious effect on the performance of the wheels. Indeed it actually improves the performance at higher downfeed rates

EXAMPLE 5

This Example illustrates the effect of adding an acid to the bonding adjuvant. In this case the acid was malic acid (MA).

The modified adjuvants were incorporated in with raw bond formulations similar to those described in Example 2. The formulations were made into bars that were tested as before for the break force. The data obtained are set forth in Table 6 below.

TABLE 6

| FORMULATION | 17 Exp. HS30 | 18 Exp. HS30 + Water | 19 Exp. HS30 + Water + MA | 20 Exp. HS30 + Water + MA | 21 Exp. HS30 + Water + MA | 22 Exp. HS30 + MA | 23 Exp. HS30 + AR30 + MA |
|---|---|---|---|---|---|---|---|
| 38A80 | 1000 | 1000 | 1000 | 1000 | 1000 | 1000 | 1000 |
| Dextrin | 8.0 | 8.0 | 8.0 | 8.0 | 8.0 | 8.0 | 8.0 |
| AR30 (gram) | — | — | — | — | — | — | 9.6 |
| Sol (gram) | 19.2 | 19.2 | 9.2 | 9.6 | 11.50 | 13.4 | 6.7 |
| Water (gram) | — | 3.0 | 1.5 | 4.8 | 3.9 | — | — |
| Malic Acid (gram) | — | — | 1.5 | 4.8 | 3.9 | 5.8 | 2.9 |
| Raw Bond (gram) | 134.5 | 134.5 | 134.5 | 134.5 | 134.5 | 134.5 | 134.5 |
| Mixing Condition | Very Dry Dusting | Very Dry Dusting | Dry Dusting | Good | Good | Good | Good |
| Molding Condition | Poor Dusting | Poor Dusting | Poor Dusting | Good | Good | Good | Good |
| Green-1* Break Force (gram) | 170 | 236 | 255 | 250 | 274 | 322 | 277 |
| Standard Deviation | — | — | — | 12 | 3 | 7 | 26 |
| Green-2* Break Force (gram) | — | — | — | 328 | 375 | 383 | 346 |
| Standard Deviation | — | — | — | 8 | 12 | 21 | 42 |

1* = Molded right after mixing
2* = Molded 20 hours after mixing

It should be noted that the formulations with malic acid additions had a significantly higher green strength than those made in the absence of the additive. It is further significant that the green strength increased upon maturing before firing.

EXAMPLE 7

This Example describes the effect on plunge slot grinding performance as a result of the incorporation of malic acid in a grinding wheel formulation of the kind described in Example 3.

The test rig was essentially the same as that described in Example 4 except that the wheels made had a 5 inch diameter, the wheel speed was 8500 sfpm and the piece ground was 16 inches × 4 inches 4340 steel with a hardness of Rc 44-48. Only two downfeed rates were evaluated: 0.5 and 1.0 mil.

The data obtained are set forth in Table 7 and 8 below.

TABLE 7

| FORMULATION | BOND | BINDER | FW g/cc (Theory) | FW g/cc (Acted) | MOE d/cm$^2$ | SBP 2/15 |
|---|---|---|---|---|---|---|
| 23 | Raw | D1 + AR 30 | 2.101 | 2.096 | 45.29 | 2.03 |
| 24 | Raw | D1 + M.A. + HS 30 | 2.101 | 2.108 | 44.73 | 2.05 |
| 25 | Raw | D1 + M.A. + SM 30 | 2.101 | 2.109 | 44.73 | 2.20 |
| 26 | Frit | D1 + Water + D2 | 2.101 | 2.088 | 44.53 | 2.19 |
| 27 | Frit | D1 + HS 30 + D2 | 2.101 | 2.105 | 46.61 | 2.00 |
| 28 | Frit | D1 + SM 30 + D2 | 2.101 | 2.104 | 45.95 | 2.00 |

TABLE 8

| FORMULATION | BOND | BINDER | DOWN FEED | FINISH | MRR in$^3$/m/in | G-Ratio |
|---|---|---|---|---|---|---|
| 23 | Raw | D1 + AR 30 | 0.5 | 90 | 0.2929 | 73.7 |
| 24 | Raw | D1 + M.A. + HS 30 | 0.5 | 92 | 0.2921 | 45.2 |
| 25 | Raw | D1 + M.A. + | 0.5 | 108 | 0.2929 | 73.8 |

TABLE 8-continued

| FORMULATION | BOND | BINDER | DOWN FEED | FINISH | MRR in³/m/in | G-Ratio |
|---|---|---|---|---|---|---|
| 26 | Frit | D1 + Water + D2 | 0.5 | 63 | 0.2921 | 61.9 |
| 27 | Frit | D1 + HS 30 + D2 | 0.5 | 85 | 0.2929 | 55.4 |
| 28 | Frit | D1 + SM 30 + D2 | 0.5 | 92 | 0.2944 | 90.5 |
| 23 | Raw | D1 + AR 30 | 1.0 | 73 | 0.5917 | 69.0 |
| 24 | Raw | D1 + M.A. + HS 30 | 1.0 | 90 | 0.5917 | 68.7 |
| 25 | Raw | D1 + M.A. + SM 30 | 1.0 | 88 | 0.5902 | 63.6 |
| 26 | Frit | D1 + Water + D2 | 1.0 | 68 | 0.5902 | 58.3 |
| 27 | Frit | D1 + HS 30 + D2 | 1.0 | 80 | 0.5902 | 63.0 |
| 28 | Frit | D1 + SM 30 + D2 | 1.0 | 57 | 0.5902 | 68.1 |

As the above data show there is no significant deterioration in the grinding performance as a result of the incorporation of the malic acid additive.

The formulations used in Table 7 and 8 were as set out in Table 9 below.

TABLE 9

| FORMULATION (gm) | 23 | 24 | 25 | 26 | 27 | 28 |
|---|---|---|---|---|---|---|
| Abrasive | 2300 | 2300 | 2300 | 2300 | 2300 | 2300 |
| Bond | 309.35 | 309.35 | 309.35 | 270.71 | 270.11 | 270.11 |
| AR-30 | 44.16 | — | — | — | — | — |
| Water | — | 2.07 | — | 47.16 | — | — |
| D1 | 18.4 | 18.4 | 18.4 | 29.9 | 29.9 | 29.9 |
| D2 | — | — | — | 46.0 | 46.0 | 46.0 |
| HS-30 | — | 30.91 | — | — | 47.61 | — |
| SM-30 | — | — | 30.91 | — | — | 47.61 |
| MA | — | 13.25 | 13.25 | — | — | — |

What is claimed is:

1. A bonding adjuvant for vitreous bonds which comprises a silica sol, abrasive material and an organic binding agent effective to enhance bonding of the silica to the surface of aluminous abrasive grits, and an additive selective from the group consisting of boron oxide and malic acid; in proportions to provide a solids content of from about 10 to about 30 weight % of silica and from about 30 to about 50 weight % of organic binding agent and from about 10–20 weight percent of additive, all proportions being based on the solids content of adjuvant.

2. A bonding adjuvant according to claim 1 in which the organic binding agent comprises a plurality of hydroxyl groups capable of hydrogen bonding with the surface of the grit and the silica.

3. A bonding adjuvant according to claim 1 in which the silica sol has a silica particle size of from about 3 millimicrons to about 40 millimicrons.

4. A bonding adjuvant according to claim 1 in which the organic binding agent is selected from the group consisting of dextrin, starch, animal glue, agarose, lecithin and pectin.

5. A bonding adjuvant according to claim 1 in which the silica sol is provided in the form of a sodium silicate solution.

6. A bonding adjuvant according to claim 1 which comprises up to about 20 weight %, based on the solids content of the adjuvant, of boron oxide.

7. A bonding adjuvant for vitreous bonds which comprises:

a. about 35 to about 45 weight % of a 30% solids silica sol;
  b. about 65 to about 55 weight % of an organic binding agent selected from dextrin and starch; and
  c. from about 10 up to about 20 weight %, based on the solids content of the adjuvant, of boron oxide.

8. A bonding adjuvant according to claim 1 which further comprises from about 1 to about 10%, based on the solids weight, of malic acid.

9. A bonding adjuvant according to claim 7 which further comprises from about 1 to about 10%, based on the solids weight, of malic acid.

10. A process for the bonding of aluminous abrasive grits which comprises:

(a) treating the grits with a bonding adjuvant which comprises a silica sol, an organic binding agent effective to enhance bonding of the silica to the surface of aluminous abrasive grits and an additive selected from the group consisting of boron oxide and malic acid, in proportions to provide the adjuvant with from about 10 to about 30 wt. % of silica, from about 30 to about 50 wt. % of organic binding agent, and from about 10 to about 30 weight % of additive, all proportions being based on the solids content of the adjuvant;
  (b) mixing the treated grits with a vitreous bond material; and
  (c) forming the mixture of bond and treated grits into a shape and firing to produce a bonded abrasive product.

11. A process according to claim 10 in which the vitreous bond comprises a glass frit.

12. A process according to claim 10 in which from about 20 to 100% by weight of the organic binding agent component of the bonding adjuvant is added with the silica sol component to the abrasive grits before admixture with the bond and up to about 80% is added after admixture with the bond.

13. A process according to claim 12 in which the bond is a glass frit and from about 50 to about 80% by weight of the organic binding agent component of the formulation is added after admixture of the grits with the bond.

14. A process according to claim 10 in which the bond is aged for a period of up to two weeks before it is fired.

* * * * *